(12) United States Patent
Ogino et al.

(10) Patent No.: US 8,276,861 B2
(45) Date of Patent: Oct. 2, 2012

(54) CLIPS FOR MOUNTING A PANEL TO A VEHICLE

(75) Inventors: Tetsuya Ogino, Toyota (JP); Takeshi Nishimoto, Tokoname (JP)

(73) Assignee: Daiwa Kasei Kogyo Kabushiki Kaisha, Aichi (JP)

( * ) Notice: Subject to any disclaimer, the term of this patent is extended or adjusted under 35 U.S.C. 154(b) by 245 days.

(21) Appl. No.: 12/715,871

(22) Filed: Mar. 2, 2010

(65) Prior Publication Data
US 2010/0219313 A1   Sep. 2, 2010

(30) Foreign Application Priority Data
Mar. 2, 2009   (JP) .................................. 2009-48240

(51) Int. Cl.
*A47B 96/06*   (2006.01)
(52) U.S. Cl. ......... 248/231.81; 24/297; 24/555; 24/564; 248/229.16; 248/229.26; 248/316.7; 296/72
(58) Field of Classification Search ............ 248/231.81, 248/229.16, 229.26, 316.7, 226.11, 222.12, 248/229.11, 228.7; 403/329, 397; 296/97.9, 296/193.1, 72; 24/297, 545, 555, 561, 564
See application file for complete search history.

(56) References Cited

U.S. PATENT DOCUMENTS

| 6,074,150 | A | * | 6/2000 | Shinozaki et al. | 411/508 |
| 7,178,206 | B2 | * | 2/2007 | Kuhnle et al. | 24/297 |
| 2001/0018784 | A1 | * | 9/2001 | Pitcher et al. | 24/200 |
| 2002/0014788 | A1 | | 2/2002 | Fujita et al. | |
| 2010/0012804 | A1 | * | 1/2010 | Egan | 248/231.81 |
| 2010/0329815 | A1 | * | 12/2010 | Jackson et al. | 411/357 |
| 2011/0225778 | A1 | * | 9/2011 | Lubera et al. | 24/297 |

FOREIGN PATENT DOCUMENTS

| JP | 2002-012059 | 1/2002 |
| JP | 2006-151022 | 6/2006 |

* cited by examiner

*Primary Examiner* — Ramon Ramirez
(74) *Attorney, Agent, or Firm* — Patterson Thuente Christensen Pedersen, P.A.

(57) ABSTRACT

One aspect according to the present invention includes a base portion and a clamp portion. The base portion can be joined to a first member of a vehicle. The clamp portion is formed integrally with the base portion and can joined to a second member of the vehicle. The clamp portion includes a first jaw and a second jaw defining a receiving space therebetween. The receiving space can receive a part of the second member. A support portion is formed on one of the first and second jaws and is positioned within the receiving space. The support portion is resiliently deformable and can apply a pressing force against the part of the second member in a direction toward the other of the first and second jaws during and after insertion of the part of the second member into the receiving space.

23 Claims, 6 Drawing Sheets

CLIPS FOR MOUNTING A PANEL TO A VEHICLE

This application claims priority to Japanese patent application serial number 2009-48240, the contents of which are incorporated herein by reference.

BACKGROUND OF THE INVENTION

1. Field of the Invention

The present invention relates to clips that may be used, for example, for attaching a mounting panel, such as an instrumental panel, of an automobile to a cowl inner panel on the side of an automobile body.

2. Description of the Related Art

This kind of clip is disclosed, for example, in Japanese Laid-Open Patent Publication No. 2006-151022. The clip disclosed in this publication includes a panel clip for attaching to an instrumental panel and a body clip for attaching to a side of a body. The body clip is inserted into a clamp portion of the panel clip and is then clamped by the clamp portion from opposite side, so that the body clip and the panel clip are coupled together. In order to prevent relative movement between the clips in the state of being coupled together, this publication proposes to adhere a non-woven fabric or the like onto a surface of the body clip.

According to the technique disclosed in the above publication, the clip requires two separate members including the panel clip and the body clip, which leads to increase in the manufacturing cost. In addition, in order to absorb unevenness in thickness on the side of the body and the coupling position of the panel clip and the body clip, a load required for inserting the body clip into the clamp portion of the panel clip is set to a higher value. This may increase a work burden in the operation for coupling the clips together. In the case that the non-woven fabric or the like is adhered to the surface of the body clip, the manufacturing cost may be further increased. In addition, if the non-woven fabric or the like is deteriorated, the intended movement preventing function is lowered and may lead to generation of abnormal noise.

As a countermeasure of the above problem, it may be considered to eliminate the body clip. In such a case, the clamp portion of the panel clip attached to the instrumental panel clamps the part of the body directly from opposite sides. With this mounting structure, it is difficult to ensure a stable mounting condition because resilient claws contacting with the body within the clamp portion of the panel clip and capable of being bent for absorbing the tolerance of the thickness of the body are in contact with the body by their leading ends having small contact areas. Therefore, if the position of the body changes in the forward and rearward directions of the automobile, it may be possible that the resilient claws cannot contact the body or the contact areas are decreased further. Decrease in the contact areas may cause rattling in the pivotal movement (prying movement) of the clip about the contact point with the body when vibrations or the like of the automobile occur.

Therefore, there is a need in the art for a clip that is attachable to a mounting panel and can be joined in stable to a body-side member.

SUMMARY OF THE INVENTION

One aspect according to the present invention includes a base portion and a clamp portion. The base portion can be joined to a first member of a vehicle. The clamp portion is formed integrally with the base portion and can joined to a second member of the vehicle. The clamp portion includes a first jaw and a second jaw defining a receiving space therebetween. The receiving space can receive a part of the second member. A support portion is formed on one of the first and second jaws and is positioned within the receiving space. The support portion is resiliently deformable and can apply a pressing force against the part of the second member in a direction toward the other of the first and second jaws during and after insertion of the part of the second member into the receiving space.

DETAILED DESCRIPTION OF THE INVENTION

Figure 1:
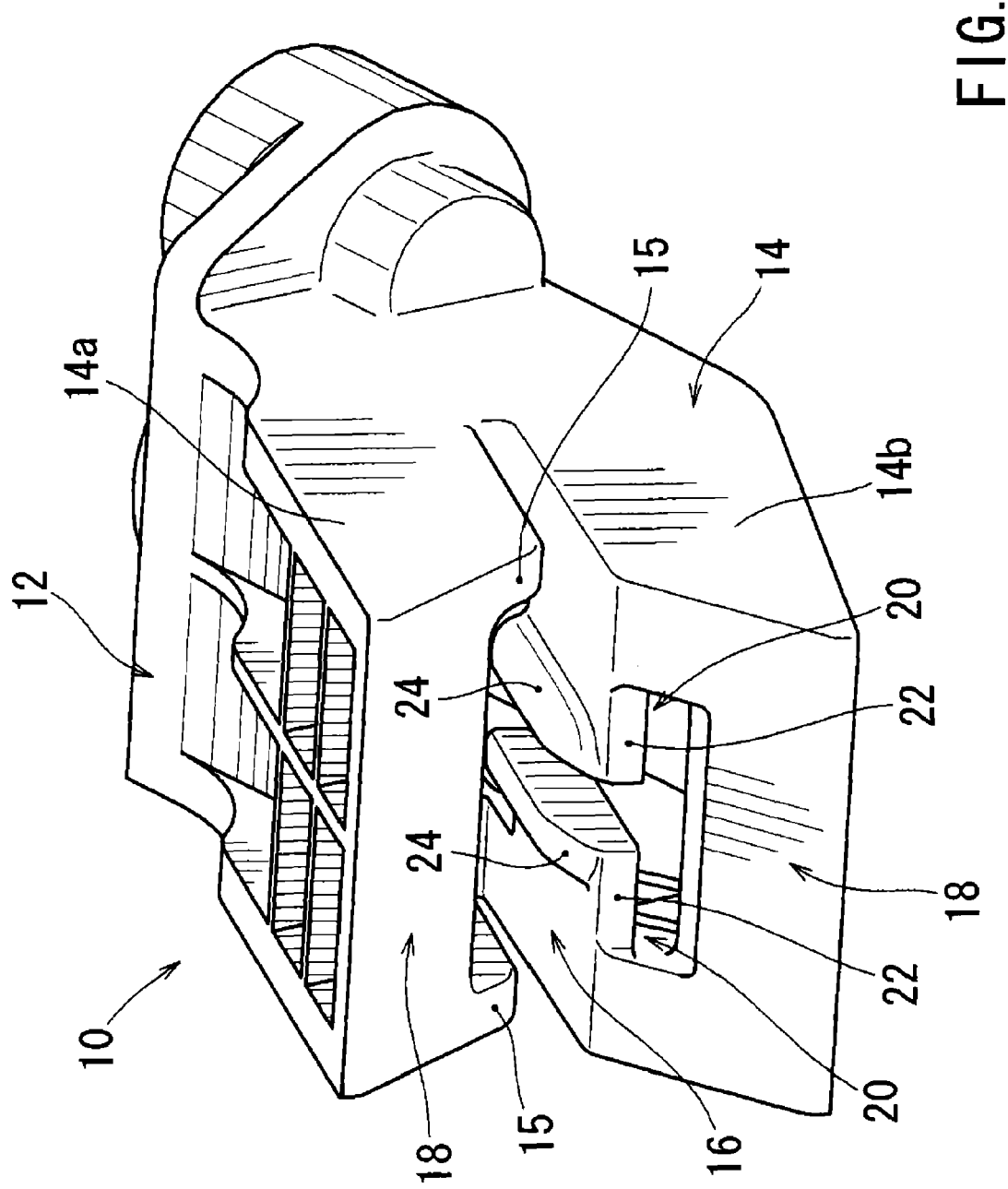
FIG. 1 is a perspective view of a clip according to an embodiment of the present invention.

Each of the additional features and teachings disclosed above and below may be utilized separately or in conjunction with other features and teachings to provide improved clips. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a clip used for mounting a mounting panel to a body-side member of a vehicle includes a base and a clamp portion. The base can be joined to the mounting panel. The clamp portion can be joined to the body-side member in a state that a part of the body-side member is clamped from opposite sides. The clamp portion includes a receiving space having an opening end, from which the portion of the body-side member can be inserted. A support portion is disposed within the receiving space and extends in an inserting direction of the part of the body-side member. The support portion can contact a surface of the part of the body-side member over a range more than half a length of the receiving space in the inserting direction. An effective size of the receiving space determined on the basis of the support portion is set to be smaller than a minimum tolerable value of the thickness of the part of the body-side member, so that the support portion can be bent according to the thickness of the part of the body-side member inserted into the receiving space.

With this arrangement, even in the case that the position of the part of the body-side member, to which the clamp portion of the clip is joined, is changed in the forward and rearward directions or the upward and downward directions, the support portion is kept is contact with the surface of the part of the body-side member because the support portion can contact the surface of the part of the body-side member over a range more than half the length of the receiving space in the inserting direction. Therefore, it is possible to maintain the joint condition of the clamp portion to the part of the body-side member in stable without causing rattling due to vibrations of the vehicle.

In addition, because the mounting panel can be mounted to the body-side member by using only the clip that is joined to the mounting panel, it is possible to reduce the manufacturing cost in comparison with the use of two separate clips including a panel clip joined to the mounting panel and a body clip joined to the body-side member. In addition, it is not necessary to use a non-woven fabric that may be attached to the surface of the body clip for preventing rattling between the body clip and the panel clip. Therefore, the manufacturing cost can be further reduced and it is possible to avoid occurrence of rattling and generation of abnormal sound due to deterioration of the non-woven fabric, which may be caused by a long time use.

The support portion may include first and second support portions each including a flexible tab and a rib protruding from a leading end of the flexible tab for contacting with a surface of the part of the body-side member. The flexible tabs of the first and second support portions extend from opposite side walls defined within the clamp portion in directions perpendicular to the inserting direction. Each of the flexible tab and the rib of each of the first and second support portions extends continuously in the inserting direction over a range more than half a length of the receiving space in the inserting direction. The flexible tabs of the first and second support portions can be bent independently of each other according the thickness of the part of the body-side member inserted into the receiving space.

With the arrangement of the flexible tabs extending from the opposite side walls of the clamp portion in directions perpendicular to the inserting direction of the part of the body-side member, each of the ribs can reliably contact the part of the body-side member over a long range in the inserting direction. Therefore, the joint condition of the clamp portion to the body-side member can be kept in stable. Further, because the first and second support portions are spaced from each other and are positioned on opposite sides within the clamp portion, it is possible to efficiently use their flexible properties for absorbing the change in thickness of the part of the body-side member.

Each of the ribs of the first and second support portions may have a contact surface contacting with the surface of the part of the body-side member and configured as an arcuate surface. This may lead to reduce a force required for inserting the part of the body-side member into the clamp portion.

An embodiment of the present invention will now be described with reference to the drawings. Referring to FIG. 1, a clip 10 is made of resin and is an integrally molded product. The clip 10 generally includes a base portion 12 and a clamp portion 14 that are molded integrally with each other.

Figure 4:
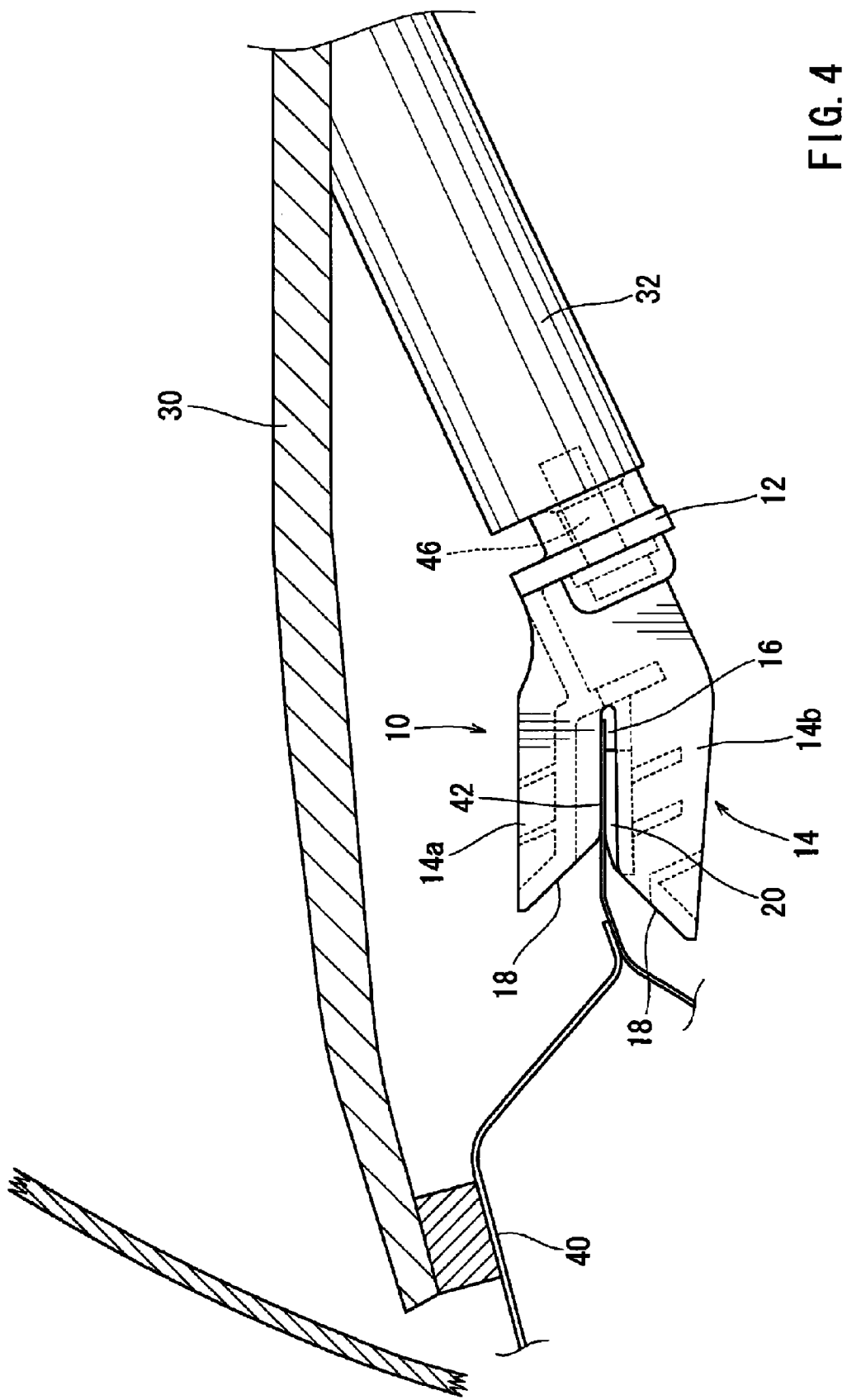
FIG. 4 is a side view showing a state of mounting an instrumental panel to an cowl inner panel by using the clip.

In this embodiment, the clip 10 is used for joining an instrumental panel 30 and a cowl inner panel 40 to each other (see FIG. 4). As shown in FIG. 4, the instrumental panel 30 has a boss portion 32. The boss portion 32 is molded integrally with a back surface of the instrumental panel 30 and can be joined to the base portion 12 of the clip 10. On the other hand, the cowl inner panel 40 has a flange 42 that can be joined to the clamp portion 14 of the clip 10. The cowl panel 40 is an example of a body-side member on the side of a vehicle body. The instrument panel 30 is an example of a mounting panel that is mounted to the body-side member.

Figure 5:
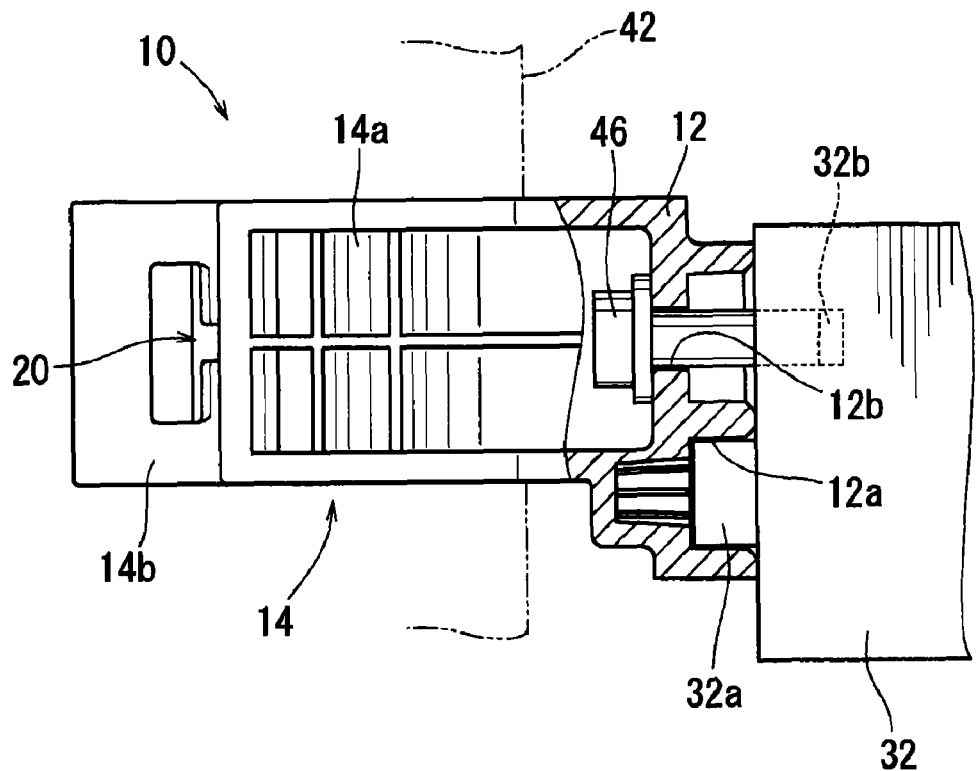
FIG. 5 is a plan view of the clip with a part shown in cross section and showing the mounting state of the clip to a boss portion of the instrumental panel.

As shown in FIG. 5, the base portion 12 has a positioning recess 12a and a screw insertion hole 12b. A projection 32a is formed on an end surface of the boss portion 32 of the instrumental panel 30 and can be fitted into the positioning recess 12a. A screw 46 can be inserted into the screw insertion hole 12b (see FIG. 5). More specifically, the screw 46 can be inserted into the screw insertion hole 12b via a receiving space 16 formed in the clamp portion 14. The screw 46 can then be engaged with a threaded hole 32b formed in the boss portion 32 of the base portion 12, so that the base portion 12 of the clip 10 can be fixedly joined to the boss portion 32.

The clamp portion 14 of the clip 10 has a bifurcated configuration and includes an upper jaw 14a and a lower jaw 14b. The receiving space 16 is defined between the upper and lower jaws 14a and 14b and can receive the flange 42 of the cowl inner panel 40. End surfaces of the upper and lower jaws 14a and 14b defining an end surface of the clamp portion 14 on the opening side of the receiving space 16 are configured as inclined surfaces 18 that are inclined toward each other for guiding the flange 42 when the flange 42 is inserted into the receiving space 16.

The clamp portion 14 has a pair of support portions 20 positioned within the receiving space 16. The support portions 20 and arranged in a widthwise direction of the clamp portion 14 and are configured to be symmetrical with each other with respect to the central line of the clamp portion 14. As shown in FIG. 1, an upper portion of the lower jaw 14b is recessed to define opposite inner side walls. Each of the support portions 20 includes a resiliently flexible tab 22 and a rib 24. The flexible tabs 22 of the support portions 20 extend from the opposite inner side walls of the lower jaw 14b toward the center with respect to the widthwise direction of the clamp portion 14. The ribs 24 protrude upward (toward the upper jaw 14a) from the leading ends of the respective flexible tabs 22.

Figure 2:
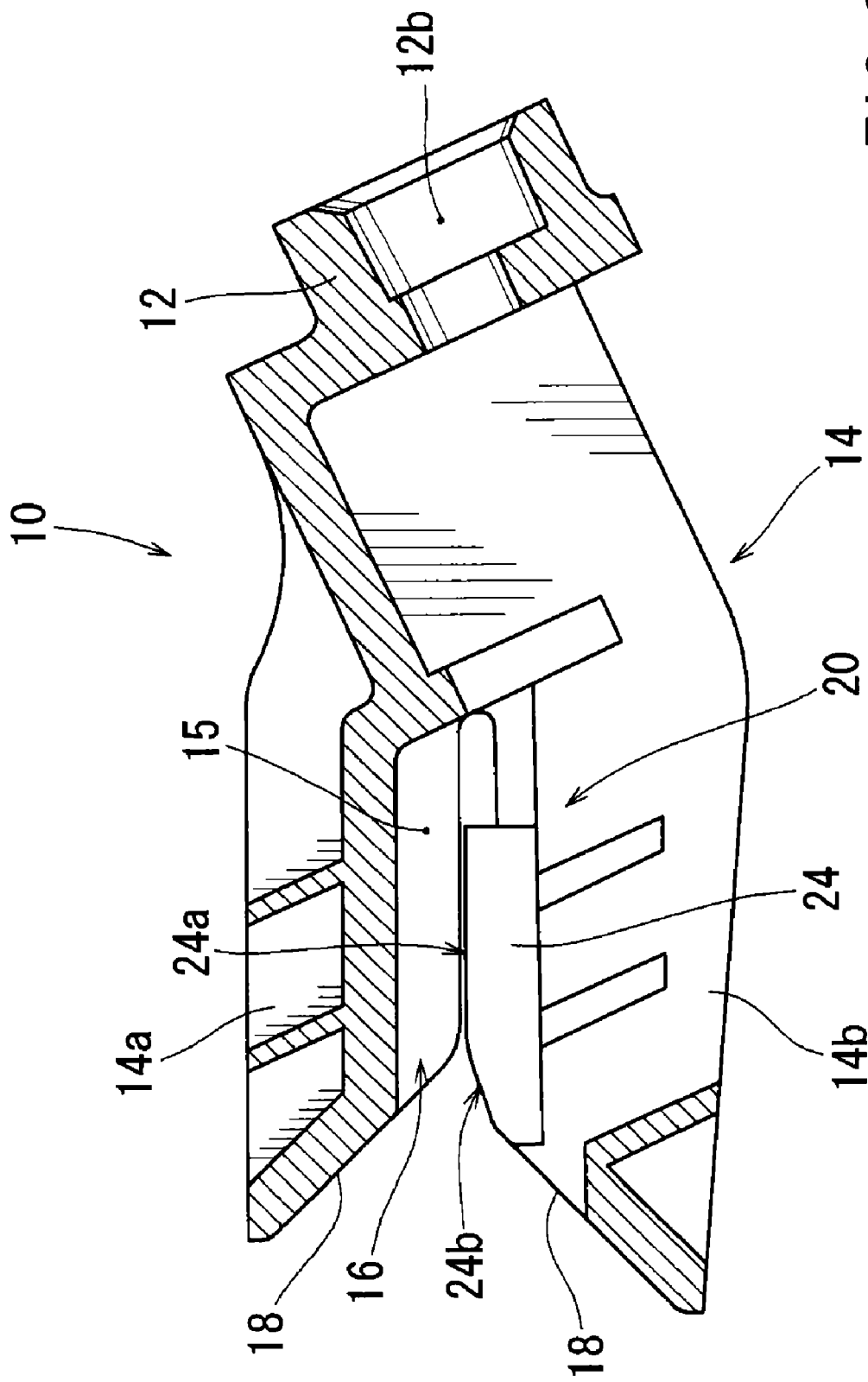
FIG. 2 is a vertical sectional view of the clip.
Figure 3:
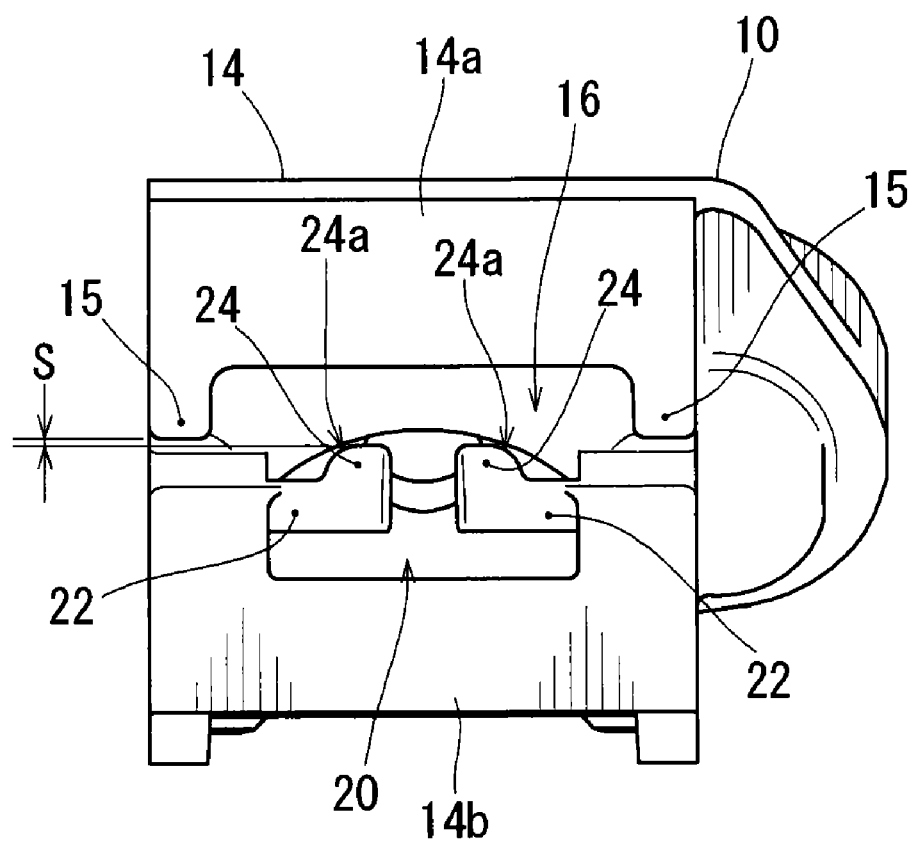
FIG. 3 is front view of the clip.

The flexible tabs 22 can be vertically resiliently bent relative to the inner side walls of the lower jaw 14b. As shown in FIG. 3, each of the ribs 24 has an upper edge with an arcuate surface 24a curved in the direction perpendicular to the inserting direction of the flange 42. The inserting direction of the flange 42 will be hereinafter called "flange inserting direction." As shown in FIG. 2, an end surface of each rib 24 positioned on the side opposite to the flange inserting direction is configured as an inclined surface 24b that extends in series with the inclined surface 18 of the lower jaw 14b if the inclined surface 18 is extended further upward. Therefore, the inclined surfaces 24b of the ribs 24 cooperate with the inclined surface 18 for guiding the flange 42 when the flange 42 is inserted into the receiving space 16.

Figure 6:
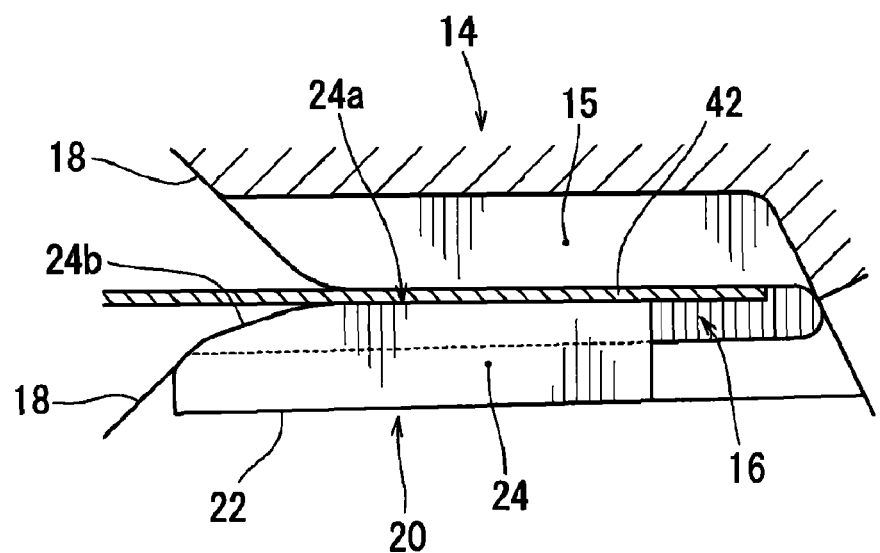
FIG. 6 is a side view of a part of the clip and showing the state of being joined to the cowl inner panel.

As shown in FIGS. 2 and 6, the flexible tabs 22 and the ribs 24 of the support portions 20 extend along a length more than half the length of the receiving space 16 in the flange inserting direction. On the other hand, also as shown in FIGS. 2 and 6 the upper jaw 14a has a pair of ribs 15 protruding downward (toward the lower jaw 14b) from opposite ends in the widthwise direction of the upper jaw 14a. The ribs 15 extend along the entire length of the receiving space 16 in the flange inserting direction. It may be possible to configure the support portions 20 such that the flexible tabs 22 and the ribs 24 extend along the entire length of the receiving space 16 in the flange inserting direction.

The effective size of the receiving space 16 of the clamp portion 14 is determined by a distance S (see FIG. 3) between the ribs 24 of the support portions 20 of the lower jaw 14b and the ribs 15 of the upper jaw 14a. In this embodiment, the distance S is set to be smaller a minimum tolerable value of the thickness of the flange 42.

Figure 7:
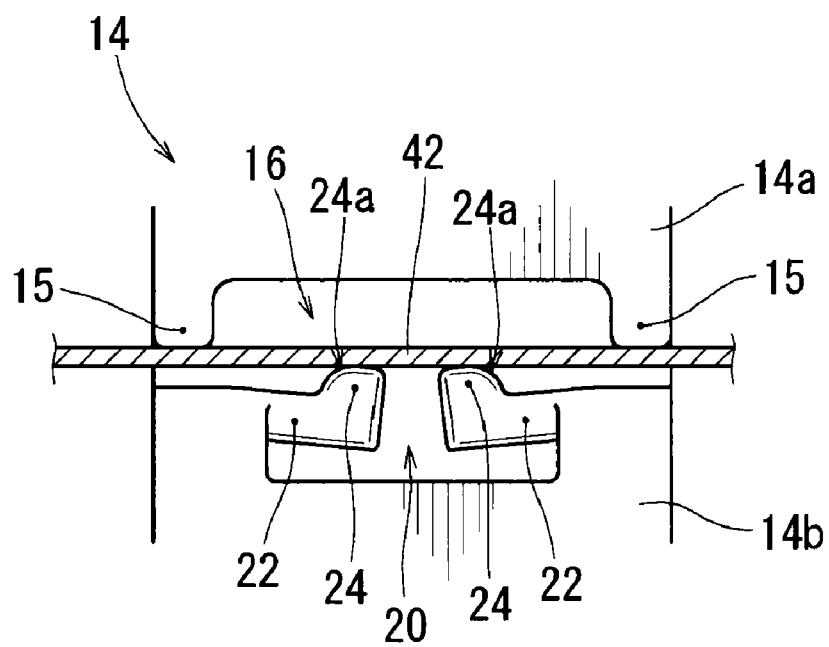
FIG. 7 is a front view of a part of the clip and showing the state of being joined to the cowl inner panel.

As the flange 42 of the cowl inner panel 40 is inserted into the receiving space 16, the upper surface of the flange 42 contacts the ribs 15 of the upper jaw 14a of the clamp portion 14 while the lower surface of the flange 42 contacts the ribs 24 of the support portions 20 (see FIGS. 6 and 7). When the flange 42 has been completely inserted into the receiving space 16, the ribs 15 of the upper jaw 14a and the ribs 24 of the support portions 20 respectively contact the upper and lower surfaces of the flange 42 over a long range along the flange inserting direction, so that the flange 42 is clamped from its upper and lower sides. As a result, the clamp portion 14 of the clip 10 is joined to the flange 42 of the cowl inner panel 40.

The flexible tabs 22 of the support portions 20 are resiliently bent according to the thickness of the flange 42 inserted into the receiving space 16, while the arcuate surfaces 24a of the ribs 24 contact the lower surface of the flange 42 as shown in FIG. 7. Therefore, a force necessary for inserting the flange 42 into the receiving space 16 can be reduced. In addition, because the flexible tabs 22 are bent substantially about axes that are perpendicular to the flange inserting direction, it is possible to maintain the arcuate surfaces 24a in contact with the flange 42 during over half the stroke of movement of the flange 42 within the receiving space 16.

The operation of mounting the instrumental panel 30 to the cowl inner panel 30 by using the clip 10 will now be described. First, the base portion 12 of the clip 10 is joined to the boss portion 32 of the instrumental panel 30. This operation is performed by fitting the projection 32a of the boss portion 32 into the positioning recess 12a of the base portion 12, inserting the screw 46 into the screw insertion hole 12b of the base portion 12, engaging the screw 46 with the threaded hole 32b of the boss portion 32, and tightening the screw 46 into the threaded hole 32b (see FIG. 5). As shown in FIG. 5, the thread insertion hole 12b is positioned at a central position between the support portions 20 of the clamp portion 14. Therefore, the tightening position of the screw 46 is not offset from the central position with respect to the widthwise direction of the clip 10. As a result, a stable joining state of the clip 10 to the boss portion 32 is achieved.

Next, the flange 42 of the cowl inner panel 40 is inserted into the clamp portion 14 of the clip 10 as the instrumental panel 30 is positioned relative to the cowl inner panel 40. Therefore, as described previously, the flange 42 is clamped from its upper and lower sides by the ribs 15 of the upper jaw 14a of the clamp portion 14 and the ribs 24 of the support portions 20, so that the clamp portion 14 and the flange 42 are joined to each other. In this state, the ribs 24 of the support portions 20 contact the lower surface of the flange 42 over a long range along the flange inserting direction, i.e., over half the length of the receiving space 16 in the flange inserting direction.

As described above, according to the above embodiment, it is possible to assemble the instrumental panel 30 and the cowl inner panel 40 with each other by using the clip 10 that is a one-piece element, without use of two separate elements, such as a panel clip and a body clip of the known art. In addition, because the ribs 24 of the support portions 20 are in contact with the flange 42 over more than half the length of the receiving space 16 in the flange inserting direction, it is possible to hold the flange 42 in stable irrespective of change of position of the flange 42 in the forward and rearward directions or the upward and downward directions. As a result, it is possible to reliably prevent the flange 42 from rattling in the pivoting (prying) direction due to vibrations of the automobile.

Although not shown in the drawings, practically, the instrumental panel 32 may have a plurality of boss portions 32 and the cowl inner panel 40 may have a plurality of flanges 42 corresponding to the boss portions 32. In this connection, a plurality of clips 10 are used for joining the instrumental panel 30 to the cowl inner panel 40 at a plural number of positions.

The above embodiment may be modified in various ways. For example, although the flexible tabs 22 extend from the opposite side walls of the clamp portion 14 in a direction perpendicular to the flange inserting direction, the flexible tabs 22 may extend from the opposite side walls in directions inclined relative to the flange inserting direction by an angle smaller than 90°. In addition, although the side edges of the flexible tabs 22, which are opposed to each other, extend parallel to each other, the side edges may be inclined relative to each other.

Figure 8:
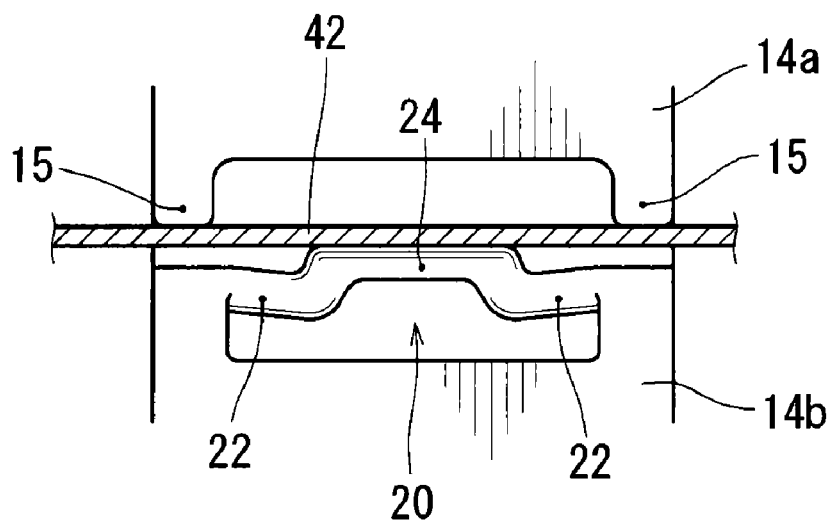
FIG. 8 is a front view similar to FIG. 7 but showing an alternative embodiment.

Further, although the ribs 24 of the support portions 20 are provided separately from each other, the ribs 24 may be joined to each other to form a single rib 24A as shown in FIG. 8.

This invention claims:

1. A clip used for mounting a mounting panel to a body-side member of a vehicle, comprising:
   a base portion capable of being joined to the mounting panel;
   a clamp portion capable of being joined to the body-side member in a state that a part of the body-side member is clamped from opposite sides;
   wherein the clamp portion includes a receiving space having an opening end, from which the part of the body-side member can be inserted; and
   a support portion disposed within the receiving space and extending in an inserting direction of the part of the body-side member;
   wherein the support portion includes a contact surface within the receiving space that extends over a range more than half a length of the receiving space in the inserting direction of the part of the body-side member, the contact surface being capable of contacting a surface of the part of the body-side member, the contact surface contacting the part of the body-side member in line-to-line contact relationship along the inserting direction of the part of the body-side member;
   wherein an effective size of the receiving space determined on the basis of the support portion is set to be smaller than a minimum tolerable value of a thickness of the part of the body-side member, so that the support portion can be bent according to the thickness of the part of the body-side member inserted into the receiving space.

2. The clamp as defined in claim 1, wherein:
   the support portion includes first and second support portions each including a flexible tab and a rib protruding from a leading end of the flexible tab for contacting with a surface of the body-side member;
   the flexible tabs of the first and second support portions extend from opposing side walls defined within the clamp portion in directions perpendicular to the inserting direction;

each of the flexible tab and the rib of each of the first and second support portions extends continuously in the inserting direction over a range more than half a length of the receiving space in the inserting direction; and the flexible tabs of the first and second support portions can be bent independently of each other according the thickness of the part of the body-side member inserted into the receiving space.

3. The clip as defined in claim 2, wherein each of the ribs of the first and second support portions has a contact surface contacting with the surface of the part of the body-side member and configured as an arcuate surface.

4. The clip as defined in claim 1, wherein the clip is a one-piece member having the base portion and the clamp portion integrated with each other.

5. The clip as defined in claim 4, wherein the clip is made of resin and is molded into one piece.

6. A clip comprising:
a base portion capable of being joined to a first member of a vehicle;
a clamp portion formed integrally with the base portion and capable of being joined to a second member of the vehicle;
wherein the clamp portion comprises:
a first jaw and a second jaw defining a receiving space therebetween, the receiving space being capable of receiving a part of the second member; and
a support portion formed on one of the first and second jaws and positioned within the receiving space, the support portion including a contact surface capable of contacting the part of the second member, the contact surface contacting the part of the second member in line-to-line contact relationship along the inserting direction of the part of the second member;
wherein the support portion is resiliently deformable and can apply a pressing force against the part of the second member in a direction toward the other of the first and second jaws during and after insertion of the part of the second member into the receiving space.

7. The clip as in claim 6, wherein:
the contact surface of the support portion is capable of contacting with the part of the second member during and after insertion of the part of the second member into the receiving portion; and
the contact surface extends along a length more than half the length of the receiving space in an inserting direction of the part of the second member into the receiving space.

8. The clip as in claim 7, wherein the contact surface is curved in a direction perpendicular to the inserting direction.

9. The clip as in claim 8, wherein the support portion can be resiliently bent about an axis extending substantially parallel to the inserting direction.

10. The clip as in claim 8, wherein:
the support portion includes a first support portion and a second support portion;
the contact surface includes a first contact surface formed on the first support portion and a second contact surface formed on the second support portion;
the first support portion can be resiliently bent in a first direction about a first axis;
the second support portion can be resiliently bent in a second direction about a second axis;
the first axis and the second axis extend substantially parallel to the inserting direction; and
the first and second directions are opposite to each other.

11. The clip as in claim 10, wherein the first and second support portions can be bent independently of each other.

12. The clip as in claim 10, wherein the first and second support portions are integrated with each other, so that the first and second contact surfaces extend in series with each other.

13. The clip as in claim 10, wherein the first and second support portions have configurations symmetrical with each other with respect to a central line of the receiving space extending in the inserting direction.

14. An apparatus comprising:
a first member and a second member each constituting a part of a vehicle; and
a clip capable of joining the first member and the second member to each other:
wherein the clip comprises:
a base portion capable of being joined to the first member; and
a clamp portion formed integrally with the base portion and capable of being joined to the second member;
wherein the clamp portion comprises:
a first jaw and a second jaw defining a receiving space therebetween, the receiving space being capable of receiving a part of the second member; and
a support portion formed on one of the first and second jaws and positioned within the receiving space, the support portion including a contact surface capable of contacting the part of the second member, the contact surface contacting the part of the second member in line-to-line contact relationship along the inserting direction of the part of the second member;
wherein the support portion is resiliently deformable and can apply a pressing force against the part of the second member in a direction toward the other of the first and second jaws during and after insertion of the part of the second member into the receiving space.

15. The apparatus as in claim 14, wherein:
the contact surface of the support portion is capable of contacting with the part of the second member during and after insertion of the part of the second member into the receiving portion; and
the contact surface extends along a length more than half the length of the receiving space in an inserting direction of the part of the second member into the receiving space.

16. The apparatus as in claim 15, wherein the contact surface is curved in a direction perpendicular to the inserting direction.

17. The apparatus as in claim 16, wherein the support portion can be resiliently bent about an axis extending substantially parallel to the inserting direction.

18. The apparatus as in claim 16, wherein:
the support portion includes a first support portion and a second support portion;
the contact surface includes a first contact surface formed on the first support portion and a second contact surface formed on the second support portion;
the first support portion can be resiliently bent in a first direction about a first axis;
the second support portion can be resiliently bent in a second direction about a second axis;
the first axis and the second axis extend substantially parallel to the inserting direction; and
the first and second directions are opposite to each other.

19. The apparatus as in claim 18, wherein the first and second support portions can be bent independently of each other.

20. The apparatus as in claim 18, wherein the first and second support portions are integrated with each other, so that the first and second contact surfaces extend in series with each other.

21. The apparatus as in claim 18, wherein the first and second support portions have configurations symmetrical with each other with respect to a central line of the receiving space extending in the inserting direction.

22. A clip used for mounting a mounting panel to a body-side member of a vehicle, comprising:
   a base portion capable of being joined to the mounting panel;
   a clamp portion capable of being joined to the body-side member in a state that a part of the body-side member is clamped from opposite sides;
   wherein the clamp portion includes a receiving space having an opening end, from which the part of the body-side member can be inserted; and
   a support portion disposed within the receiving space and extending in an inserting direction of the part of the body-side member;
   wherein the support portion includes a contact surface within the receiving space that extends over a range more than half a length of the receiving space in the inserting direction of the part of the body-side member, the contact surfaces being capable of contacting a surface of the part of the body-side member;
   wherein an effective size of the receiving space is determined on the basis of the support portion and is set to be smaller than a minimum tolerable value of a thickness of the part of the body-side member, so that the support portion can be bent according to the thickness of the part of the body-side member inserted into the receiving space; and
   wherein the support portion includes first and second support portions each including a flexible tab and a rib protruding from a leading end of the flexible tab for contacting with a surface of the body-side member, the flexible tabs of the first and second support portions extending from opposing side walls defined within the clamp portion in directions perpendicular to the inserting direction, each of the flexible tab and the rib of each of the first and second support portions extending continuously in the inserting direction over a range more than half a length of the receiving space in the inserting direction, the flexible tabs of the first and second support portions capable of being bent independently of each other according the thickness of the part of the body-side member inserted into the receiving space.

23. A clip comprising:
   a base portion capable of being joined to a first member of a vehicle;
   a clamp portion formed integrally with the base portion and capable of being joined to a second member of the vehicle, the clamp portion including a first jaw and a second jaw defining a receiving space therebetween, the receiving space being capable of receiving a part of the second member;
   a support portion formed on one of the first and second jaws and positioned within the receiving space, the support portion being resiliently deformable to apply a pressing force against the part of the second member in a direction toward the other of the first and second jaws during and after insertion of the part of the second member into the receiving space, the support portion including a first support portion and a second support portion, the support portion having a contact surface capable of contacting with the part of the second member during and after insertion of the part of the second member into the receiving portion, the contact surface extending along a length more than half the length of the receiving space in an inserting direction of the part of the second member into the receiving space, the contact surface being curved in a direction perpendicular to the inserting direction, so that the contact surface contacts the part of the second member in line-to-line contact relationship, the contact surface includes a first contact surface formed on the first support portion and a second contact surface formed on the second support portion, the first support portion capable of being resiliently bent in a first direction about a first axis, the second support portion capable of being resiliently bent in a second direction about a second axis, the first axis and the second axis extending substantially parallel to the inserting direction, the first and second directions being substantially opposite to each other.

* * * * *